United States Patent [19]

Roach

[11] 4,131,990
[45] Jan. 2, 1979

[54] METHOD OF MAKING SQUIRREL CAGE ROTOR

[75] Inventor: Thomas A. Roach, Denver, N.C.

[73] Assignee: Service First, Inc., Charlotte, N.C.

[21] Appl. No.: 838,466

[22] Filed: Oct. 3, 1977

Related U.S. Application Data

[62] Division of Ser. No. 570,511, Apr. 22, 1975, Pat. No. 4,064,410.

[51] Int. Cl.² ............................................. H02K 15/02
[52] U.S. Cl. ..................................... 29/598; 228/185; 228/257
[58] Field of Search .................. 29/598; 310/211, 212, 310/42, 265; 228/185, 257, 258

[56] References Cited

U.S. PATENT DOCUMENTS

| | | | |
|---|---|---|---|
| 1,433,622 | 10/1922 | Johnson et al. | 310/211 |
| 2,200,126 | 5/1940 | Smith | 310/211 |
| 3,401,280 | 9/1968 | Lackey et al. | 29/598 X |
| 3,826,940 | 7/1974 | McKean et al. | 310/211 |

*Primary Examiner*—Carl E. Hall
*Attorney, Agent, or Firm*—Bell, Seltzer, Park & Gibson

[57] ABSTRACT

A method of installing rotor bars in a dynamoelectric machine rotor of the type having a shaft, a laminated magnetic core carried by the shaft, with the core having a plurality of arcuately spaced longitudinal passageways therethrough for accommodating the rotor bars. The rotor bars are inserted in the core with end portions of the bars protruding beyond the end laminations at opposite ends of the core, and a pair of end rings disposed at opposite ends of the core are joined to the protruding end portions of the rotor bars. The axially facing inner end surface of each end ring has a series of arcuately spaced radially extending channels formed therein with intervening arcuately spaced radially extending ribs defined therebetween, with the channels receiving the protruding end portions of the rotor bars therein, and with the ribs bearing tightly against the end laminations at opposite ends of the laminated core to maintain the laminated core in tightly compressed condition.

3 Claims, 6 Drawing Figures

METHOD OF MAKING SQUIRREL CAGE ROTOR

This application is a division of commonly assigned co-pending U.S. application Ser. No. 570,511, filed Apr. 22, 1975, now U.S. Pat. No. 4,064,410.

This invention relates to dynamoelectric machines, and more particularly, to a squirrel cage rotor having an improved end ring construction and an improved arrangement and method for securing rotor bars to the end ring.

Squirrel cage rotors of the type employed in dynamoelectric machines, such as electric induction motors, conventionally include a shaft having a laminated magnetic core mounted thereon, with the core having a plurality of arcuately spaced slots extending longitudinally therethrough for receiving rotor bars. Rotor bars, formed of electrically conductive metal, extend through the core and are joined electrically and mechanically to one another by means of a pair of end rings located at opposite ends of the core. In one well-known method of rotor construction, the rotor bars and end rings are formed as an integral unit by casting or injection molding with molten aluminum or an alloy thereof. The outer axially facing surface of each end ring has fan blades formed thereon, while the inner axially facing surface of the end ring abuts the end laminations of the core. By way of example, cast aluminum rotor bars and end rings of this general type are disclosed in Picozzi U.S. Pat. No. 3,234,419, issued Feb. 8, 1966 and in Endress Pat. No. 3,778,652, issued Dec. 11, 1973.

After a motor has been in service for a period of time, it is not uncommon for failure or breakage of one or more of the rotor bars to occur. Failure or breakage of a significant number of the rotor bars adversely affects the operating characteristics of the motor and generally requires that the motor be disassembled and the rotor be replaced or rebuilt. For economic reasons, it is usually desirable to salvage the shaft and laminated core and to rebuild the rotor by replacing the rotor bars and end rings.

In rebarring a rotor of the above-described type having integrally cast aluminum end rings and rotor bars, the end rings are first cut from the rotor. The remaining rotor bars, which extend internally through the laminated core, are then removed by immersing the rotor in a highly corrosive liquid, such as heated caustic, which attacks the aluminum rotor bars but which does not affect the steel laminations. The new rotor bars are inserted through the core and are joined at opposite ends to the new end rings, usually by welding or brazing.

In rebarring techniques presently known in the industry, the replacement rotor bars are positioned through the core and protrude beyond the end laminations at opposite ends of the core. The axially facing inner surfaces of the end rings are spaced apart from the end laminations of the core in order to provide access for welding the protruding ends of the rotor bars to the end rings. This spacing between the end laminations of the core and the end rings leaves the end laminations of the rotor core unrestrained and free to expand or "fan out", often resulting in undesirable mechanical and electrical operating characteristics.

Additionally, this spacing means that the welds joining the new rotor bars to the new end rings must be made in highly confined spaces. As a result, it is extremely difficult to consistently obtain high integrity joints between the rotor bars and the end rings and an undesirably high failure rate occurs at these joints.

With the foregoing in mind, it is a primary object of this invention to overcome the aforementioned problems associated with the known methods of rebarring rotors.

More particularly, it is a primary object of this invention to provide an improved rotor rebarring method which achieves a significantly stronger and more reliable connection between the rotor bars and the end rings than has been heretofore obtainable.

It is also an object of this invention to provide an improved method for securing replacement rotor bars to an end ring in which the rotor bars are connected securely to the end ring while the laminations of the core are maintained in tightly compressed condition by the end rings.

It is a further object of this invention to provide a rotor rebarring method which is considerably more economical than prior rebarring methods, and which is well adapted for use in new rotor construction as well.

The above and other objects of this invention are accomplished by providing an end ring of an improved design wherein the axially facing inner end portion thereof has a series of arcuately spaced radially extending ribs provided therearound with intervening arcuately spaced radially extending channels being defined therebetween.

In accordance with the invention, the rotor bars are positioned in the laminated core with end portions of the rotor bars protruding beyond the end laminations at opposite ends of the core. An end ring of the above-described improved design is positioned over the rotor shaft at each end of the laminated core and the protruding end portions of the rotor bars are positioned in the channels formed in the axially facing inner surface of the end ring. The end rings are then axially compressed toward one another so that the ribs between adjacent channels on the end ring bear tightly against the end laminations of the core at arcuately spaced locations over the core to maintain the laminations of the core immobilized and in tightly compressed condition. The protruding end portions of the rotor bars positioned in the channels of the end rings are then welded to the end rings while the end rings are maintained under axial compression. The protruding end portions of the rotor bars thus positioned in the channels are essentially surrounded by the walls of the channels and thus present a substantial surface area for being welded to the channels.

Welding is preferably accomplished by heating the end rings and the protruding end portions of the rotor bars to fusion temperature to allow the end portions of the rotor bars to soften and fuse to the end rings. A heat flowable material is preferably also introduced into each channel to fill the spaces between the end portions of the rotor bars and the sides of the adjacent ribs to thereby insure a good electrical and mechanical connection between the rotor bars and the end rings. The radially outwardly extending channels provide ready access to the rotor bars from the exterior of the rotor for applying heat and for introducing the filler material.

In addition to providing a significant improvement in the reliability of the welded joint between the rotor bars and the end ring, the present invention significantly reduces costs, since considerably less welding time is required, as compared to the prior known rebarring techniques.

Some of the objects and advantages of the invention having been stated, others will appear as the description proceeds, when taken in connection with the accompanying drawings, in which FIG. 1 is a perspective view of a squirrel cage rotor in accordance with this invention, shown in exploded relation with the end rings separated therefrom to reveal the construction of the axially facing inner surfaces thereof;

Figure 1:
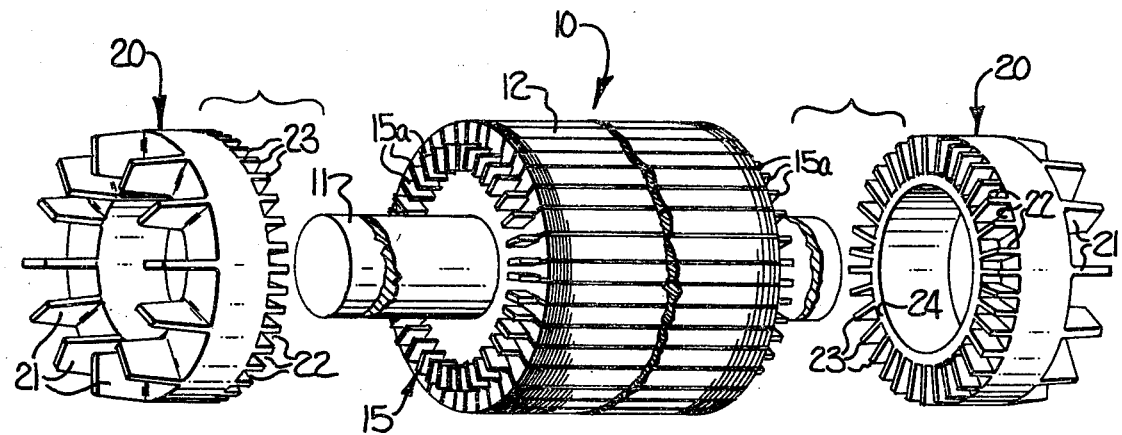

Referring now in more detail to the drawings, there is shown in FIG. 1 in exploded relation, the rotor member 10 of a large electric motor which is provided with an electrical winding of a type referred in the art as a "squirrel cage" winding. Rotor 10 comprises a shaft 11 having a generally cylindrical core 12 mounted coaxially thereon. The rotor core 12 is a laminated core and comprises a stack of laminations or punchings of a magnetic material such as steel. Each lamination has a series of arcuately spaced slots formed therein near the outer radial periphery thereof, indicated at 13 in FIG. 3, with the slots in adjacent stacked laminations of the core being aligned throughout the length of the core to define arcuately spaced longitudinally extending passageways through the core. A plurality of longitudinal rotor bars 15 of an electrically conductive metal are positioned in the passageways and, as illustrated, are of a greater length than the axial length of the laminated core 12 so that end portions 15a of the rotor bars 15 protrude beyond the end laminations of the core.

The rotor 10 also includes a pair of end rings, generally indicated at 20, at opposite ends of the core and which electrically and mechanically interconnect the rotor bars 15. The end rings 20 may be formed of any suitable electrically conductive metal, such as copper, bronze, or other alloys. Preferably, the end rings 20 and the rotor bars 15 are all formed from the same material. As illustrated, the end rings 20 are of hollow cylindrical construction and have an axially outwardly facing annular end portion with a plurality of arcuately spaced fan blades 21 thereon. As illustrated, the major or outside diameter of the end rings is only slightly smaller than the diameter of core 12, while the minor or inside diameter of the core is substantially greater than the diameter of shaft 11.

Referring still to FIG. 1, it will be noted that the axially inwardly facing annular end portion of end ring 20 is provided with a series of arcuately spaced radially extending ribs 23 therearound with intervening arcuately spaced radially extending channels 22 being defined therebetween. As illustrated, each of the channels 22 is of a substantially uniform depth along the radial direction thereof, with all channels of the end ring being of a like depth which is substantially less than the axial dimension or thickness of the end ring 20. Also as illustrated, the end surfaces of ribs 23 all lie in a common plane perpendicular to the axis of the ring.

In the preferred form of the invention illustrated, the end rings are formed as castings. The ribs 23 are formed of substantially uniform width along the radial direction while the channels 22 increase in width in the outward radial direction. As illustrated, the ribs radiate outwardly from an annular member 24 adjacent the inside diameter of the end ring. The axially facing surface of annular member 24 defines an annular shoulder coplanar with end surfaces of ribs 23 and extending along the inner radial portions of the inner end portion of end ring 20.

Figure 2:
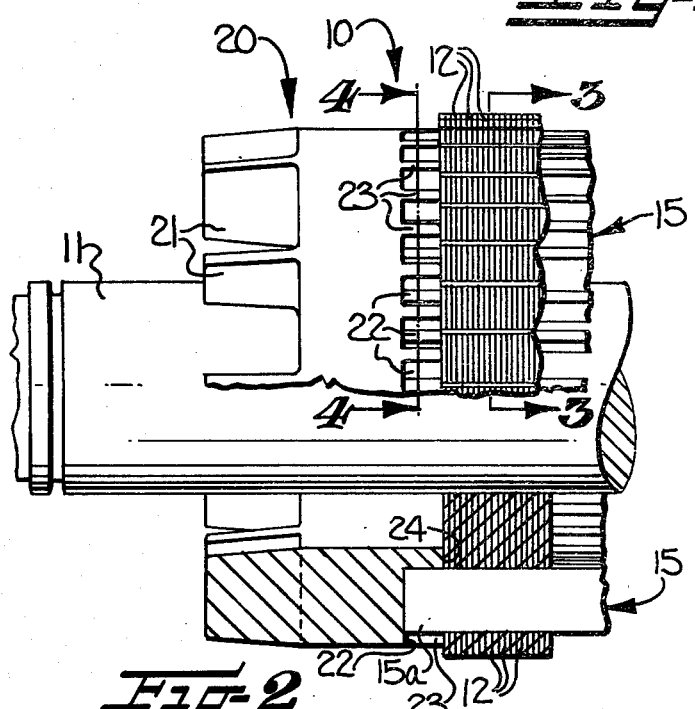
FIG. 2 is a plan view, partially in section, of one end of a rotor in accordance with this invention.
Figure 4:
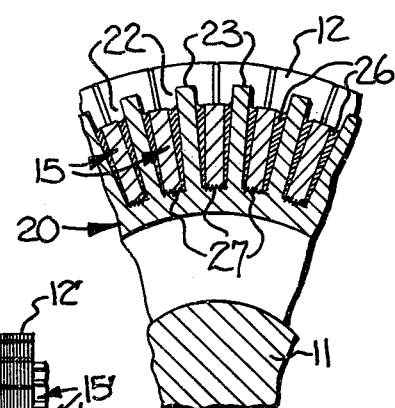
FIG. 4 is a sectional view similar to FIG. 3, but taken along the line 4—4 of FIG. 2.

Referring now to the rotor in assembled relation, as illustrated in FIG. 2, it will be seen that the protruding end portions 15a of the rotor bars 15 are positioned respectively in the arcuately spaced channels 22 of the end ring 20 and that the ribs 23 thereof bear against the end laminations of core 12 to maintain the laminations under compression. The walls of each channel 22 thus surround the end portion 15a of each respective rotor bar 15 on opposite sides, on the underside, and on the end, and, together with the end lamination of core 12, define a radially extending "well" surrounding the end 15a of the rotor bar and accessible from the outside for welding. Referring to FIG. 4, it will be noted that the thus defined "wells" are each filled with a filler material 26, in a manner described in more detail hereinafter, which fills any spaces between the walls of channels 22 and the ends 15a of the rotor bars and secures the rotor bars firmly in place. Each "well" is filled to a substantially equal depth, which as illustrated, is sufficient to reach the radially outermost surface of the rotor bars 15.

Figure 3:
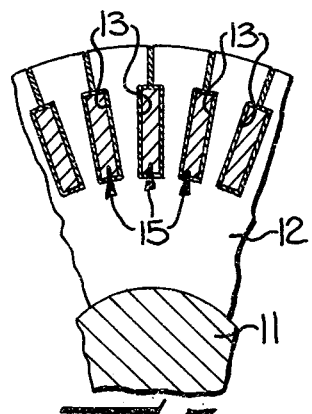
FIG. 3 is a sectional view of the rotor taken transverse to the axial direction of the rotor and substantially along the line 3—3 of FIG. 2.

Referring to FIGS. 3 and 4, it will be seen that the annular shoulder of annular member 24 on the inner axial face of end ring 20 engages the end laminations of core 12 continuously along a circular path spaced inwardly from the periphery of the core and below the location of the slots 13 formed in the laminations to axially compress the core laminations together. The ribs 22, which radiate outwardly from the annular shoulder, engage the end laminations of the core at arcuately spaced locations between the slots 13 and thus compress and immobilize the outer peripheral portions of the laminated core and prevent the same from spreading apart.

While the ribs 22 are illustrated as lying in a common plane so that all of the ribs bear against the end laminations of the core, it will be appreciated that contact by less than all of the ribs may, in some instances, provide adequate compression and immobilizing of the laminations. However, it is generally preferred to have all of the ribs bear against the core.

Figure 5:
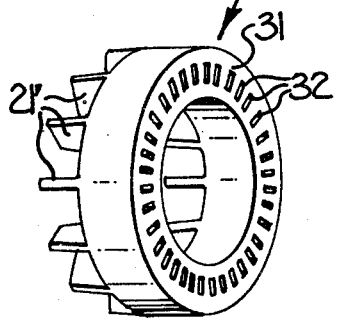
FIG. 5 is a perspective view showing the construction of an end ring of the type employed in a prior art rotor rebarring method.
Figure 6:
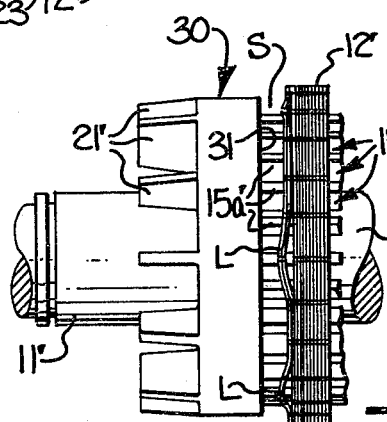
FIG. 6 is a plan view showing one end of a rotor which was rebarred in accordance with a prior art rebarring method and employing an end ring of the construction shown in FIG. 5.

FIG. 5 illustrates the construction of a replacement end ring employed pursuant to one rebarring technique employed in the industry, while FIG. 6 illustrates a rotor which has been rebarred in accordance with this prior rebarring technique and employing an end ring of the construction illustrated in FIG. 5. To avoid repetitive description, parts of the rotor which are substantially the same as previously described parts are designated by the same reference characters, where applicable, with prime notation added.

Referring to FIG. 5, it will be noted that the end ring 30 of the prior construction has a substantially planar inner end surface 31 which is provided with a series of arcuately spaced holes or sockets 32 for receiving the ends of the rotor bars. The ends 15a' of the rotor bars 15' are positioned in the sockets 32 and welded in place by brazing.

It will be noted from FIG. 6 that it is necessary to leave a spacing S between the end laminations of the core 12' and the inner end surface 31 of the end ring in order to provide access for reaching the ends 15a' of the rotor bars with the brazing rod. The highly confined space in which to work makes it extremely difficult to obtain consistent welds of high integrity. Additionally, since the necessity of providing a spacing S leaves the end laminations of the core 12' unrestrained, it often happens that the end laminations move apart or spread out in some areas, as indicated at L, resulting in undesirable mechanical and electrical operating characteristics.

In other conventional rebarring techniques, the end rings, instead of having sockets formed therein to facilitate placement of the rotor bars therein, are formed with a planar end surface and the rotor bars are butted against the end surface of the end ring and welded in place by brazing. The problems noted above are present in this method also.

METHOD OF ASSEMBLY

The method of securing rotor bars in accordance with this invention is as follows:

Prior to inserting the rotor bars 15 in the core 12, the bars are first weighed to insure that they all are of similar weight to facilitate later balancing the rotor. The bars 15 are positioned in the respective passageways in the core 12 with end portions of the bars protruding from opposite ends thereof. Preferably, the length of the rotor bars is such that the bars protrude from each end of the core a distance only somewhat less than the depth of the channels 22 in the end rings so that the rotor bars extend into substantially the entire axial depth of the channels.

Next, the end rings 20 are installed over the shaft 11 and the protruding end portions 15a of the rotor bars 15 are positioned in the respective channels 22 on the inner axial face of the end rings. After centering the end rings coaxially with the shaft and insuring that the ends 15a of rotor bars 15 are properly positioned in their respective channels, the end rings are compressed axially toward one another so that the ribs 23 between adjacent channels bear tightly against the end laminations of the core. The end rings are then clamped in place under compression.

Working with one end ring at a time, the entire end ring is heated with a torch to a cherry red color. Then, a smaller torch or a pair of torches are directed successively at the protruding end portion of each of the rotor bars to heat the bar and the end ring until the base metal begins to melt to form fusion welds, indicated at 27 in FIG. 4. The radially extending cavity or "well" defined by the channel 22 and the abutting end lamination is then filled with a heat flowable filler material, such as a brazing metal, to a level substantially even with the top of the rotor bar. The walls of the channels serve as forms or molds to guide the brazing metal filler material into and around the ends 15a of the rotor bars to insure a good mechanical and electrical connection between the rotor bar and the end ring. The method of securement in accordance with this invention may be performed much more quickly than the prior methods noted above, where considerable skill and effort is required to properly direct the brazing metal into contact with the joint.

The heating and filling operation is repeated for each channel of the end ring, and then the entire operation is repeated for the opposite end ring. Care is exercised to fill each channel to a uniform level to facilitate subsequent dynamic and static balancing of the rotor.

After both end rings have been welded to the respective rotor bars, a hardenable liquid filler material 34 is introduced into the longitudinally extending passageways through the core to fill any spaces between the rotor bars and the surrounding walls defining the passageways and thereby immobilize the rotor bars in the passageways. Preferably, this is accomplished by dipping the entire rotor into an epoxy varnish and permitting the varnish to permeate and fill the slots in the rotor. The rotor is then placed in a heated oven to harden or cure the epoxy varnish. Subsequently, the rotor is chucked in a lathe and the epoxy coating is removed from the circumferential peripheral surfaces of the core by cutting. While in the lathe, both the outside diameter and the inside diameter of the end rings are machined to insure concentricity with the shaft. The rotor is subsequently balanced as necessary to insure a minimal amount of vibration at the high normal operating speeds of the rotor.

Although the present invention has been described and illustrated herein with particular reference to rebarring defective rotors, those skilled in the art will readily appreciate that the invention may readily be employed in new rotor construction as well.

In the drawings and specification, there has been set forth a preferred embodiment of the invention, and although specific terms are employed, they are used in a generic and descriptive sense only and not for purposes of limitation.

That which is claimed is:

1. In a method of installing rotor bars in a dynamoelectric machine rotor of the type having a shaft and a generally cylindrical laminated magnetic core mounted coaxially on the shaft, with the core having a plurality of arcuately spaced longitudinal passageways therethrough for accommodating the rotor bars, the steps comprising:

inserting the rotor bars in said passageways with end portions of the rotor bars protruding beyond the end laminations at opposite ends of the core, positioning an end ring over the shaft at each end of the laminated core, each end ring having an inner end portion facing said core provided with a series of arcuately spaced radially extending ribs therearound with intervening arcuately spaced radially extending channels being defined between successive ribs, guiding each end ring toward and into engagement with the end portions of the rotor bars protruding beyond the end laminations of the core and axially compressing the end rings toward one another so that the protruding end portions of the rotor bars are received in the channels of the end rings and the ribs bear tightly against the end laminations of the core at arcuately spaced locations thereover to maintain the laminations of the core immobilized and in tightly compressed condition, and welding the protruding end portions of the rotor bars positioned in the channels to the end rings while maintaining the end rings and the core under said axial compression.

2. A method according to claim 1 wherein the step of welding comprises heating the end rings and the protruding end portions of the rotor bars to fusion temperature and allowing the end portions of the rotor bars to soften and fuse to the end rings and substantially filling any spaces remaining between the end portions of the rotor bars and the sides of the ribs with a heat flowable filler material to insure a good electrical and mechanical connection between the rotor bars and the end rings.

3. In a method of installing rotor bars in a dynamoelectric machine rotor of the type having a shaft and a generally cylindrical laminated magnetic core mounted coaxially on the shaft, with the core having a plurality of arcuately spaced longitudinal passageways therethrough for accommodating the rotor bars, the steps comprising:

inserting the rotor bars in said passageways with end portions of the rotor bars protruding a predetermined distance beyond the end laminations at opposite ends of the core, positioning a hollow cylindrical end ring over the shaft at each end of the laminated core, each end ring having an axially facing inner end portion facing said core provided with a series of arcuately spaced ribs therearound with intervening arcuately spaced radially extending channels being defined between successive ribs, said channels corresponding in number to the number of rotor bars and being of a uniform depth sufficient for receiving the protruding end portions of the rotor bars therein, guiding each end ring toward and into engagement with the end portions of the rotor bars protruding beyond the end laminations of the core and axially compressing the end rings toward one another so that the protruding end portions of the rotor bars are received in the channels of the end rings and the ribs bear tightly against the end laminations of the core at arcuately spaced locations therearound to maintain the laminations of the core immobilized and in tightly compressed condition, maintaining the end rings and the core under said axial compression while heating each end ring and the protruding end portions of the rotor bars positioned in said channels to a high temperature sufficient for the end portions of the rotor bars to soften and fuse to the end ring, and maintaining the end rings and the core under said axial compression while filling each radially extending channel with a heat flowable brazing metal to a depth sufficient to substantially fill any spaces remaining between the protruding end portions of the rotor bars and the sides of the adjacent ribs to insure a good electrical and mechanical connection between the rotor bars and the end rings.

* * * * *